US012711132B2

(12) United States Patent
Gudesa et al.

(10) Patent No.: US 12,711,132 B2
(45) **Date of Patent: *Aug. 18, 2026**

(54) SHORT QUERY PRIORITIZATION FOR DATA PROCESSING SERVICE

(71) Applicant: Databricks, Inc., San Francisco, CA (US)

(72) Inventors: Venkata Sai Akhil Gudesa, Amsterdam (NL); Herman Rudolf Petrus Catharina van Hövell tot Westerflier, Willemstad (CW); Supun Chathuranga Nakandala, Dublin, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/991,083

(22) Filed: Dec. 20, 2024

(65) Prior Publication Data

US 2025/0156414 A1 May 15, 2025

Related U.S. Application Data

(63) Continuation of application No. 18/140,323, filed on Apr. 27, 2023, now Pat. No. 12,210,521.

(51) Int. Cl.
*G06F 16/2453* (2019.01)
*G06F 9/48* (2006.01)
(Continued)

(52) U.S. Cl.
CPC ........ *G06F 16/2453* (2019.01); *G06F 9/4887* (2013.01); *G06F 11/3419* (2013.01); *G06F 16/285* (2019.01)

(58) Field of Classification Search
CPC ... G06F 16/285; G06F 16/2453; G06F 9/4887
See application file for complete search history.

(56) References Cited

U.S. PATENT DOCUMENTS 8,924,981 B1 12/2014 Brown et al.
9,600,340 B1 * 3/2017 Mundar ............. H04L 67/1097
(Continued)

OTHER PUBLICATIONS

United States Office Action, U.S. Appl. No. 18/140,323, filed Mar. 19, 2024, nine pages.

*Primary Examiner* — Tarek Chbouki
(74) *Attorney, Agent, or Firm* — Fenwick & West LLP

(57) ABSTRACT

A cluster computing system maintains a first set of queues for short queries and a set second set for longer queries. The first set is allocated a majority of the cluster's processing resources and processes queries on a first in first out basis. The second set is allocated a minority of the cluster's processing resources which are shared among queries in the second set. Accordingly, the system assigns each query to the first set of queues for a fixed amount of resource time. While a query is processing, the system monitors the query's resource time and reassigns the query to the second set of queues if the query has not completed within the allotted amount of resource time. Thus, short queries receive the necessary resources to complete quickly without getting stuck behind longer queries while ensuring that longer queries continue to make progress.

20 Claims, 6 Drawing Sheets

(51) Int. Cl.
*G06F 11/34* (2006.01)
*G06F 16/28* (2019.01)

(56) References Cited

U.S. PATENT DOCUMENTS

| | | | |
|---|---|---|---|
| 10,740,332 | B2 | 8/2020 | Zhang et al. |
| 12,079,113 | B1 * | 9/2024 | Mohan ..................... G06F 5/06 |
| 2009/0254525 | A1 | 10/2009 | Srinivasan et al. |
| 2011/0055231 | A1 | 3/2011 | Huck et al. |
| 2012/0191641 | A1 | 7/2012 | Crupi et al. |
| 2016/0179953 | A1 | 6/2016 | Klotz et al. |
| 2016/0379125 | A1 | 12/2016 | Bordawekar et al. |
| 2017/0185648 | A1 | 6/2017 | Kavulya et al. |
| 2018/0004817 | A1 | 1/2018 | Nguyen et al. |
| 2021/0149903 | A1 * | 5/2021 | Won ................. G06F 16/24535 |
| 2021/0373940 | A1 | 12/2021 | Will et al. |
| 2022/0114177 | A1 | 4/2022 | Li et al. |
| 2023/0137673 | A1 * | 5/2023 | Rowan ................. G06F 9/5072 718/102 |

* cited by examiner

SHORT QUERY PRIORITIZATION FOR DATA PROCESSING SERVICE

CROSS REFERENCE TO RELATED APPLICATIONS

This application is a continuation of prior, co-pending U.S. application Ser. No. 18/140,323, filed on Apr. 27, 2023, which is incorporated hereon by reference in its entirety for all purposes.

TECHNICAL FIELD

The disclosed configuration relates generally to databases, and more particularly to query prioritization in a database based on real-time data.

BACKGROUND

Some conventional database systems treat queries equally, regardless of query length. Thus, in a mixed workload, long queries tend to dominate resource consumption, leading to long wait times for customers with short queries sharing these resources. This is a problem because customers expect short queries to process quickly and longer queries to take time. Thus, there is a mismatch in expectations when a short query takes a long time because it is stuck in the queue behind one or more long queries.

To solve this problem, some systems analyze each query to predict the query's execution time and prioritize short queries by sending them to the front of the queue. However, query size prediction is prone to misprediction which often leads to short queries being mistaken for long queries and thereby sent to the back of the queue or long queries mistaken for short queries and sent to the front of the queue. In either instance, customers waiting on short queries are inconvenienced.

The figures depict various embodiments of the present configuration for purposes of illustration only. One skilled in the art will readily recognize from the following discussion that alternative embodiments of the structures and methods illustrated herein may be employed without departing from the principles of the configuration described herein.

DETAILED DESCRIPTION

Overview

A cluster computing system allocates short queries the necessary resources to complete them quickly by giving all queries an initial fixed amount of resource time in a fast queue. Then, when a query reaches its allotted resource time, the query is gradually downgraded to a slower queue.

Data Processing Service

Figure 1:
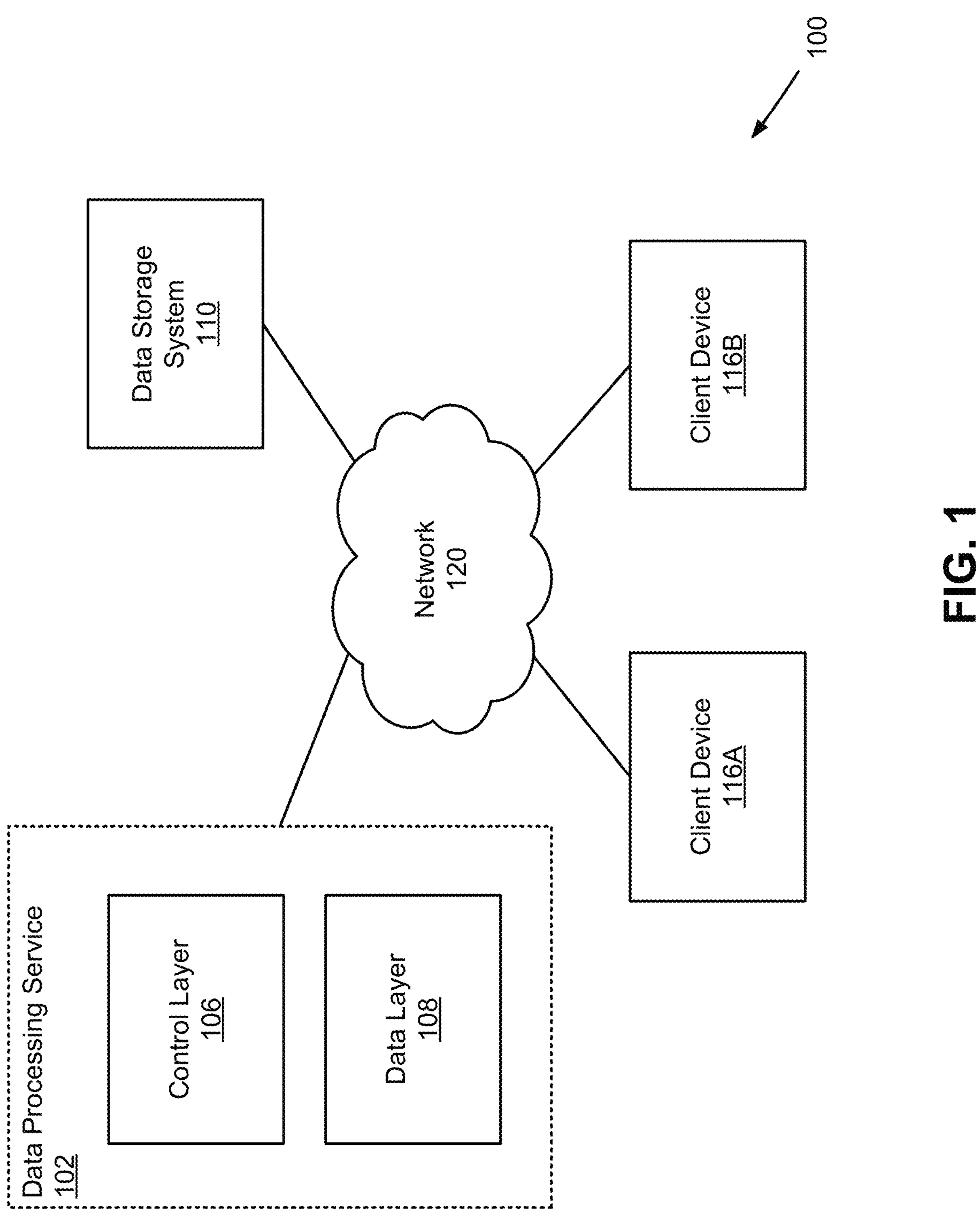
FIG. 1 is a high-level block diagram of a system environment for a data processing service, in accordance with an embodiment.

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that one or more clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing jobs. An example of a cluster computing system 402 is described in relation to FIG. 4. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. Accordingly, a single instance of the software and its supporting infrastructure serves multiple customers, each customer associated with multiple users that may access the multi-tenant system. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

In one embodiment, the data processing service 102 is configured to schedule queries into at least a first queue and a second queue. The first queue is dedicated to queries with a higher priority (e.g., short queries, metadata queries, etc.) than queries assigned to the second queue (e.g., queries with longer processing times). In some embodiments, the data processing service 102 also maintains a third queue dedicated to queries with a middle priority.

Accordingly, the data processing service 102 assigns an incoming query to the first queue, where it is divided into a set of tasks. In the first queue, the data processing service 102 allocates the query a number or amount of cluster resources (e.g., number of task engines in a first set of executor nodes) to process the set of tasks of the query. The data processing service 102 monitors the query's resource time as the query is processing and, in response to determining that the resource time for the query reaches a threshold resource time, the query's priority is downgraded, and the query is reassigned to the second queue. When the query is assigned to the second queue, the resources (e.g., first set of executor nodes) that have been dedicated to processing the query are reduced to a smaller second set of executor nodes. With the query being reassigned to the second queue, the computing system assigns resources to a query (or next query in the queue) in the first queue and at least a portion of compute resources (e.g., a portion of executor nodes from the first set of executor nodes) are reallocated to process the query in the first queue.

As queries in the first queue are completed or reassigned to the second queue and space in the first queue is freed up, resources dedicated to the first queue are adaptably made available to queries in the slower processing second queue. In one embodiment, to ensure that a set of computing resources are available for queries assigned to the first queue, the data processing service 102 reserves compute resources for queries assigned to these queues. The data processing service 102 achieves this by monitoring a number of tasks for queries assigned to the first queue and determining compute resources (e.g., a number of task engines) to reserve for queries assigned to the first queue based on the monitored number of tasks. In one embodiment, the data processing service 102 reserves the number of task engines for a next time step by applying an exponential moving average (EMA) function on a sum of pending and the running task for the first queue.

In one embodiment, the data processing service 102 maintains three queues: the first queue, a middle (third) queue, and the second queue. The first queue and the middle queue receive a majority of the cluster's processing resources (e.g., 60-80%). When a query is received, it is first assigned to the first queue. Regardless of size, all queries are initially treated equal and first assigned to the first queue, where the query remains for a first threshold resource time (e.g., 1 second of resource time). In the first queue, many queries (e.g., metadata queries) will receive enough processing resources to complete. However, after the first threshold resource time, queries that have not completed are demoted to the middle queue, where the query again remains for a second threshold resource time (e.g., 15 seconds of resource time). Most, if not all, short queries will be completed while processing in the middle queue. If the query is still not completed after reaching the second threshold resource time, the query is further relegated to the second queue where it will stay until it is completed. This allows short queries to be completed quickly without getting stuck behind longer queries while the longer queries continue to make progress with a minority of the cluster's processing resources (e.g., 40-20%).

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 106 via the network 120. In another embodiment, the client device 116 interacts with the various systems of the system environment 100 through an application programming interface (API) running on a native operating system of the client device 116, such as IOS® or ANDROID™.

Figure 2:
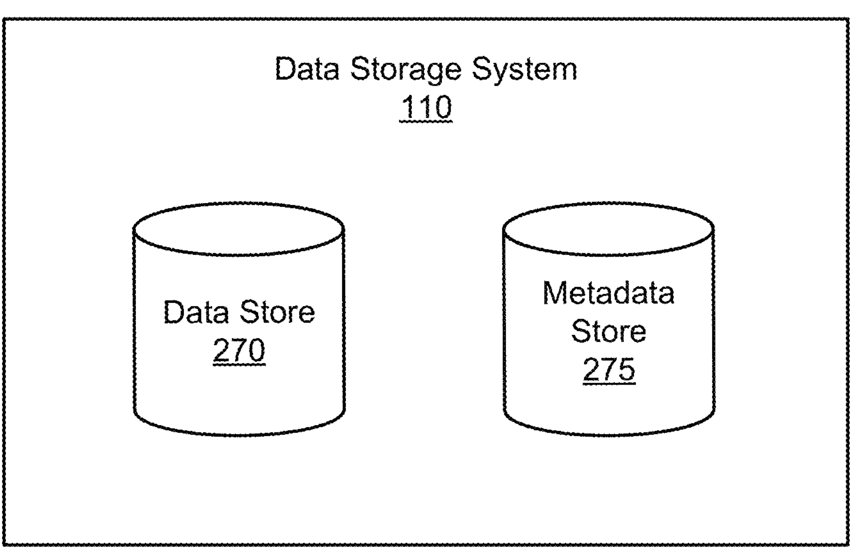
FIG. 2 illustrates a block diagram of an architecture of a data storage system, in accordance with an embodiment.

FIG. 2 is a block diagram of a data storage system 108, in accordance with an embodiment. The data storage system 108 also includes data tables store 270 and a metadata store 275.

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 108. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

Figure 3:
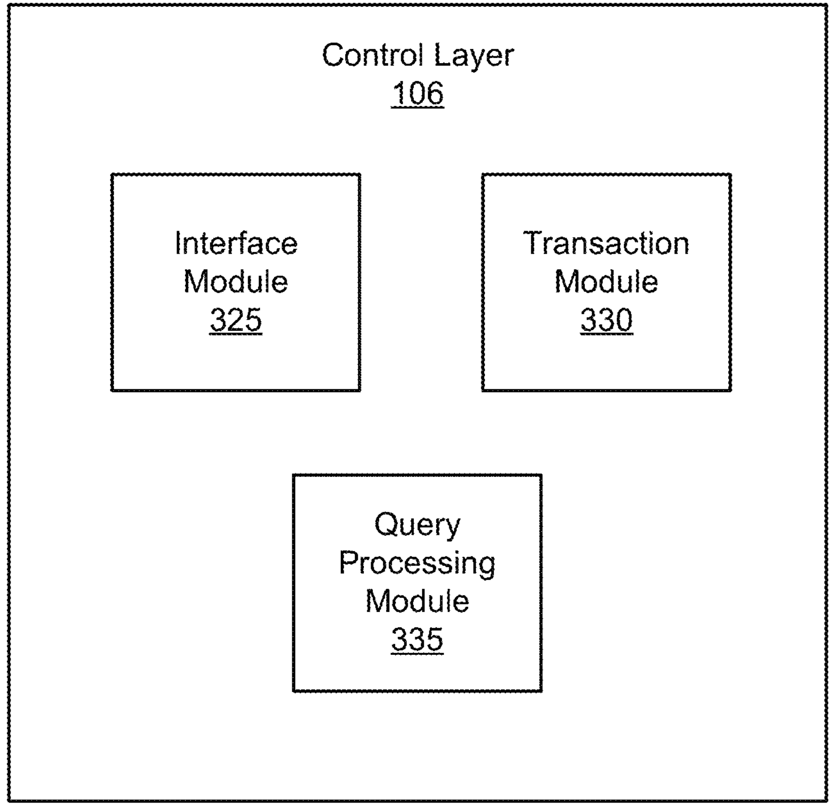
FIG. 3 illustrates a block diagram of an architecture of a control layer, in accordance with an embodiment.

FIG. 3 is a block diagram of an architecture of a control layer 106, in accordance with an embodiment. In one embodiment, the data processing system 106 includes an interface module 325, a transaction module 330, and a query processing module 335.

Interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module 325.

Transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

Query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. In one embodiment, the query processing module 335 provides one or more queries to appropriate clusters of the data layer 108 and receives responses to the queries from clusters in which the queries are executed.

Query processing module 335 manages three separate queues for processing queries, in accordance with an embodiment. Accordingly, query processing module 335 maintains at least a first set of queues for short queries and a set second set for longer queries. In some embodiments, the query processing module 335 manages a third set of queues. At a given point in time, the first set is allocated a majority of the cluster's processing resources and processes queries on a first in first out basis. The second set is allocated a minority of the cluster's processing resources which are shared among queries in the second set. Accordingly, query processing module 335 assigns each query to the first set of queues for a fixed amount of resource time. While a query is processing, the system monitors the query's resource time and query processing module 335 reassigns the query to the second set of queues if the query has not completed within the allotted amount of resource time.

Figure 4:
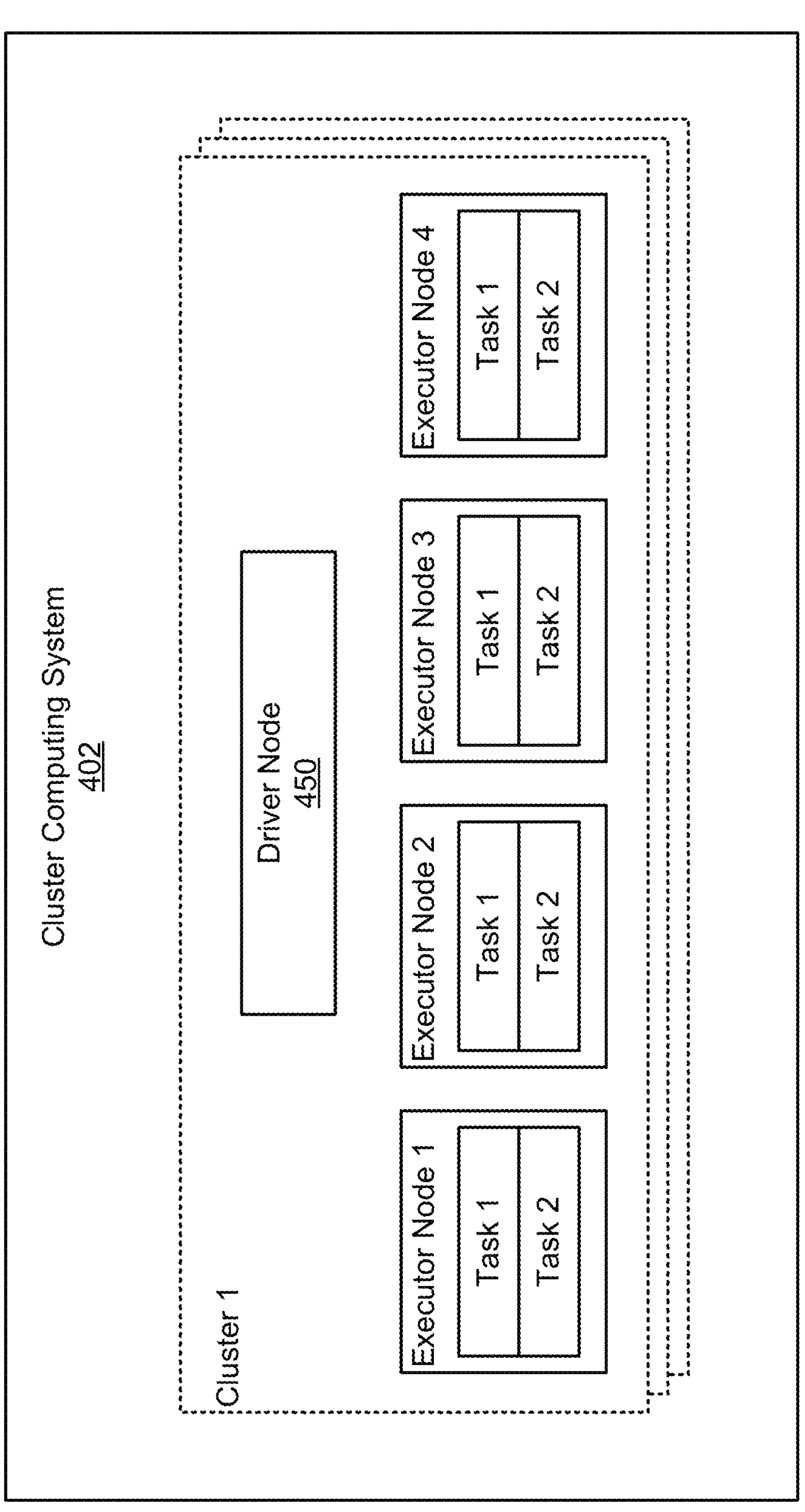
FIG. 4 illustrates a block diagram of an architecture of a cluster computing system of the data layer, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 335. The driver node 450 may compile a database query and generate an execution plan. The driver node 450 distributes the query information including the generated code to the executor nodes. Thus, the driver node 450 may divide the query into one or more tasks that are each executed by a task engine in a respective executor node. The executor nodes execute the query based on the received information.

The worker pool can include any appropriate number of executor nodes (e.g., 4 executor nodes, 12 executor nodes, 256 executor nodes). Each executor node in the worker pool includes one or more task engines for executing one or more tasks of a job stage. In one embodiment, a task engine performs single-threaded task execution in which a task is processed using one or more threads of the central processing unit (CPU). As defined herein, a task engine is one or more resources that can execute a task. A task engine can be referred to as a slot and may include one or more cores or a threads of a cluster computing system 402. The executor node distributes one or more tasks for a job stage to the one or more task engines and provides the results of the execution to the driver node 450. According to an embodiment, an executor node executes the generated code for the database query for a particular subset of data that is processed by the database query. The executor nodes execute the query based on the received information from the driver node 450.

Short Query Prioritization

Figure 5:
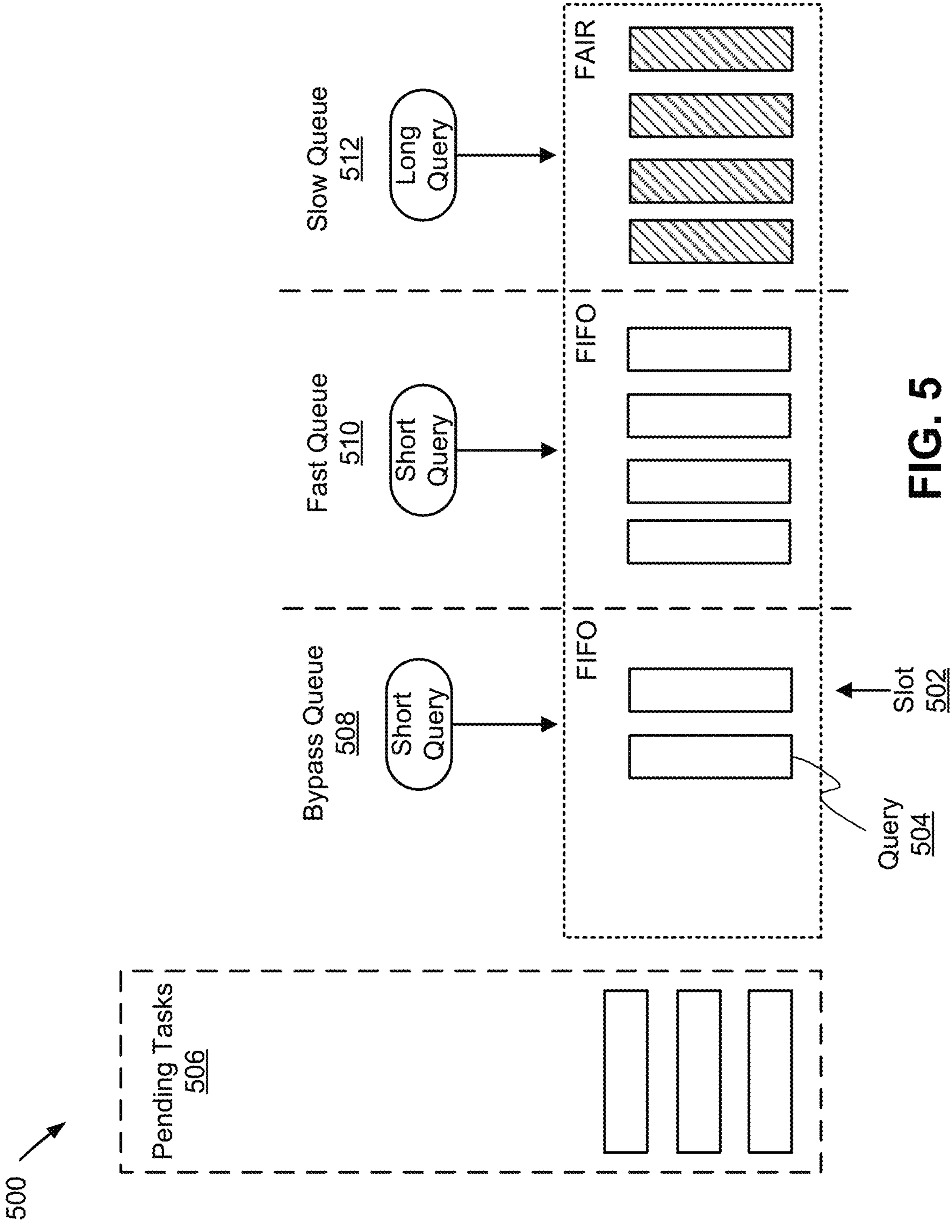
FIG. 5 illustrates a resource diagram for short query prioritization, in accordance with an embodiment.

FIG. 5 illustrates a resource diagram 500 for a method short query prioritization, in accordance with an embodiment. In a SQL endpoint cluster, there are typically 10 slots for queries to occupy. Some prior systems have treated all incoming queries equally, regardless of the query's length. This can lead to long wait times for customers with short queries, as they share resources with larger, long-running jobs. Accordingly, resource diagram 500 shows 10 slots 502 being occupied by a set of queries 504; however, the slots 502 are partitioned into 3 separate queues that are each associated with a different priority level to ensure that short queries do not get stuck for too long behind longer queries. These separate queues include bypass queue 508, fast queue 510, and slow queue 512, in one embodiment.

Bypass queue 508 and fast queue 510 receive priority on the cluster's resources to quickly process short queries. For example, short queries can take a couple of seconds to process, while long queries can take minutes and even hours. Since it is reasonable for customers to expect relatively fast turnaround times for short queries, a 5-minute delay could be a significant inconvenience for a short query customer relative to a 5-minute delay for a long query. Accordingly, cluster computing system 402 allocates short queries the necessary resources to complete them quickly by giving all queries an initial fixed amount of resource time in bypass queue 508 and fast queue 510. In one embodiment, a majority of processing resources are allocated to processing queries in bypass queue 508 and fast queue 510 (e.g., 60-80%) on a first in first out (FIFO) basis and a minority of processing resources (e.g., 40-20%) are shared among the queries in the slow queue 512 using a fair scheduling method.

Accordingly, cluster computing system 402 schedules pending tasks 506 into bypass queue 508, fast queue 510, and slow queue 512. As described above, all queries from pending task 506 are initially treated equally and each query 504 is first scheduled into bypass queue 508, regardless of expected query processing length. At a given point in time, the cluster computing system 402 may allocate cluster compute resources (e.g., number of executor nodes or task engines in a cluster) to processing queries in each queue. Moreover, each queue may be associated with a threshold resource time that governs when a query assigned to a queue can be demoted (or promoted) to the next queue. For example, the bypass queue 508 is associated with a first threshold of resource time, the fast queue 510 is associated with a second threshold of resource time, and the slow queue 512 is associated with a third threshold of resource time.

Specifically, in the example diagram of FIG. 5, at a given point in time, the cluster may reserve 70% of the available task engines to processing queries in the bypass queue 508 and the fast queue 510 and allocate the remaining 30% of the task engines to processing queries in the slow queue 512. A query 504 remains for the first threshold of resource time (e.g., 1 second of resource time) in the bypass queue 508. In one embodiment, resource time is defined as the time that a query spends processing multiplied by the number of tasks dedicated to processing the query (e.g., 3 tasks for 1 second each is 3 seconds of resource time). Many queries (e.g., metadata queries) will receive enough processing resources in bypass queue 508 and be complete completed before ever needing to be reassigned to fast queue 510. However, it is appreciated that in other embodiments, the resource time may be configured differently as appropriate.

When a query in the bypass queue 508 takes more than the first threshold resource time, query 504 is demoted to fast queue 510, where query 504 remains for a second threshold resource time (e.g., 15 seconds of resource time). Most, if not all, reasonably short queries will be completed while processing in fast queue 510. If the query is still not completed after reaching the second threshold resource time, query 504 is further relegated to slow queue 512 where it will remain until it is completed. Thus, at a subsequent time, if processing the queries assigned to the slow queue 512 (including the query 504 newly assigned to the slow queue 512) is determined to be above the 30% allocation amount, the cluster may reduce a portion or all of the task engines that were dedicated to processing the query 504, such that the queries in the slow queue 512 occupy at most the 30% of available resources in the cluster. This allows short queries to be completed quickly without getting stuck behind longer queries while the longer queries continue to make progress with a minority of the cluster's processing resources (e.g., 40-20%).

A Method for Short Query Prioritization

Figure 6:
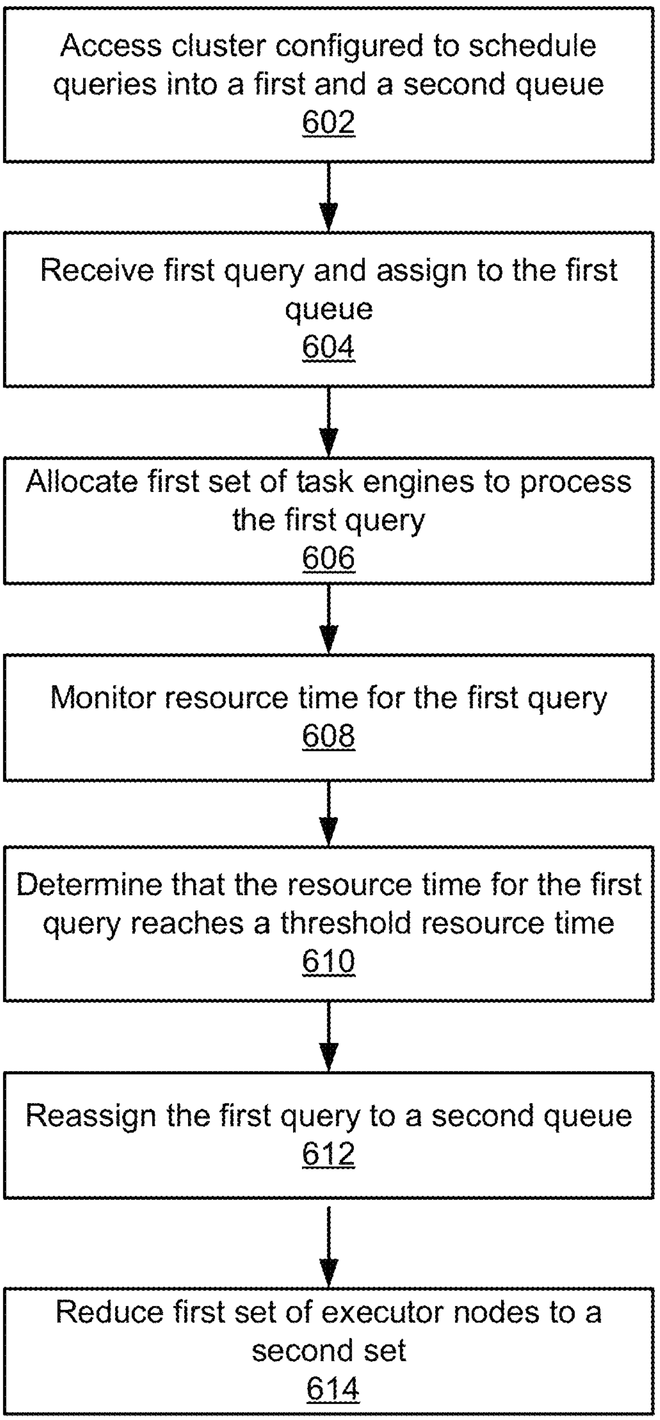
FIG. 6 is a flowchart for a method for short query prioritization, in accordance with an embodiment.

FIG. 6 is a flowchart of a method for short query prioritization, in accordance with an embodiment. The process shown in FIG. 6 may be performed by one or more components (e.g., the control layer 106) of a data processing system/service (e.g., the data processing service 102). Other entities may perform some or all the steps in FIG. 6. Embodiments may include different and/or additional steps, or perform the steps in different orders.

Query processing module 335 accesses 602 a cluster. The cluster including driver node 450 and one or more executor nodes that each include one or more task engines. The cluster is configured to schedule queries according to at least a first queue and a second queue. The first queue is dedicated to queries with a higher priority than queries assigned to the second queue.

Driver node 450 receives 604 a first query and assigns the first query to the first queue. The first query is divided into a set of tasks. Driver node 450 allocates 606 a number of task engines in a first set of executor nodes to process the set of tasks of the first query.

Driver node 450 monitors 608 a resource time for the first query as the first query is processed by the first set of executor nodes in the first queue. In one embodiment, the resource time is determined by determining, for each task of the first query, an execution time to execute the task on a respective task engine and summing the execution time of the tasks of the first query to determine the resource time (e.g., 2 tasks for 1 second processing time each is in total 2 seconds of resource time).

Responsive to determining 610 that the resource time for the first query reaches a threshold resource time, driver node 450 reassigns the first query to the second queue. Accordingly, driver node 450 reduces the first set of executor nodes dedicated to processing the first query to a second set of executor nodes.

Responsive to reassigning the first query to the second queue, driver node 450 assigns resources to a second query in the first queue. This causes at least a portion of executor nodes from the first set of executor nodes to process the second query in the first queue as the cluster prioritizes the new second query over the first query.

In one embodiment, the computing system maintains three queues—the first queue, a middle queue, and the second queue. In one instance, the first queue and the middle queue receive a majority of the cluster's processing resources (e.g., 60-80%). When a query is received, it is first assigned to the first queue. Regardless of size, all queries are initially treated equal and first assigned to the first queue, where the query remains for a first threshold resource time (e.g., 1 second of resource time). In the first queue, many queries (e.g., metadata queries) will receive enough processing resources to complete. However, after the first threshold resource time, queries that have not completed are demoted to the middle queue, where the query again remains for a second threshold resource time (e.g., 15 seconds of resource time). Most, if not all, short queries will be completed while processing in the middle queue. If the query is still not completed after reaching the second threshold resource time, the query is further relegated to the second queue where it will stay until it is completed. This allows short queries to be completed quickly without getting stuck behind longer queries while the longer queries continue to make progress with a minority of the cluster's processing resources (e.g., 40-20%).

Adaptive Slot Resource Management

As queries in bypass queue 508 and fast queue 510 are completed or reassigned to slow queue 512 and the number of pending tasks 506 approaches zero, processing resources dedicated to bypass queue 508 and fast queue 510 are freed up. Accordingly, the resources previously dedicated to bypass queue 508 and fast queue 510 can be adaptably made available to queries in slow queue 512 if, for example, there are no queries assigned to the bypass queue 508 or the fast queue 510 or only a few queries are assigned to these queues. However, it might not always be advantageous to allow the queries in slow queue 512 to immediately consume these newly freed up resources. For example, if slow queue 512 was allowed to consume 100% of the cluster's processing resources when there was no pending task 506 or current tasks in bypass queue 508 and fast queue 510, then a newly added short query may have to wait until one or more long queries are completed to receive the priority described above.

Accordingly, in one embodiment, when one query moves from one priority to another (i.e., from one queue to another), the cluster reserves resources ahead of time for queries assigned to the bypass queue 508 or the fast queue 510. Thus, the queue resources shrink and expand to adapt to what the system looks like at current state based on what resources are available.

Accordingly, at a first time, the cluster computing system 402 monitors a number of tasks for queries assigned to bypass queue 508 and fast queue 510 and determines a number of task engines to reserve for queries assigned to bypass queue 508 and fast queue 510 for a next second time step based on the monitored number of tasks at the first time. In one embodiment, the cluster computing system 402 reserves the number of task engines for the next time step by applying an exponential moving average (EMA) function on a sum of pending and the running tasks over bypass queue 508 and fast queue 510 (FIFO queue usage). Thus, the system reserves Y task engines for the queries in the first queue, where Y=f(aggressiveness, X), and where X is the sum of the pending and the running task and the aggressiveness, as explained in more detail below.

In particular, the formula for the EMA function is:

$$NewSlotReservation = \text{Aggressiveness} * (\text{Current } FIFO \text{ Usage}) + (1.0 - \text{Aggressiveness}) * OldSlotReservation$$

The aggressiveness factor ("Aggressiveness" or adaptation rate) is factor that adjusts how fast or slow the NewSlotReservation (e.g., number of task engines or executor nodes reserved for next time step) approaches the current state Current FIFO Usage (e.g., number of task engines currently used+number of task engines to be used for pending queries in over bypass queue 508 and fast queue 510). The OldSlotReservation may correspond to the reserved amount of resources for the bypass queue 508 and the fast queue 510 at the previous time step. The aggressiveness factor may be in a range from [0, 1]. For example, a high aggressiveness factor causes the EMA to move by large amounts to quickly approach the current state. A low aggressiveness factors causes the EMA to move by small amounts go gradually approach the current state. In one instance, the cluster computing system 402 determines the aggressiveness factor ("Aggressiveness") as one of three values depending on whether a quick increase to the current state, a quick decrease to the current state, or a gradual decrease to the current state is desired.

As new pending tasks 506 are added, the cluster quickly moves the reserved slots upwards to minimize lag. A high aggressiveness factor is desired, for example, 0.20 0.25, 0.275, 0.30, 0.35, 0.40. A high aggressiveness causes the EMA to move by large amounts to quickly reserve a number of task engines for the next state to make sure that there are sufficient resources to process these new tasks in the bypass queue 508 and the fast queue 510.

When bypass queue 508 and the fast queue 510 free up or are not being used, the cluster quickly cuts down on the reserved slots 502 for bypass queue 508 and the fast queue 510 to approach 0. A high aggressiveness factor is desired, for example, 0.37, 0.35, 0.39. This allows these resources to be made available to queries in the slow queue 512.

When the usage of bypass queue 508 and the fast queue 510 is decreasing due to task completions, the cluster decreases the slot 502 reservations gradually in order to reserve space for upcoming short query stage additions, if any. This prevents the slow queue 512 from scheduling and then immediately preempting the task which may incur significant scheduler overhead.

Computing System

Figure 7:
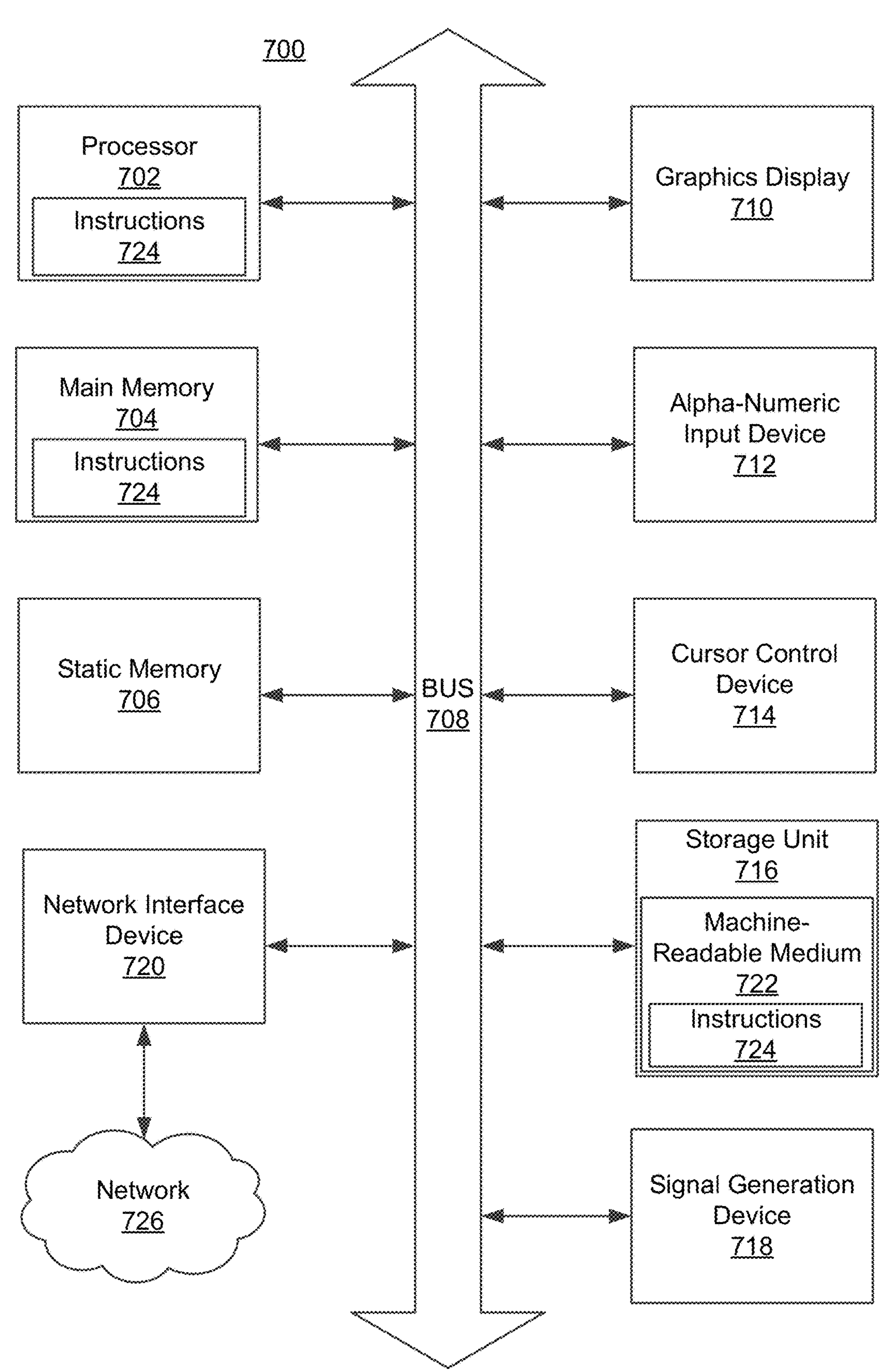
FIG. 7 illustrated is an example machine to read and execute computer readable instructions, in accordance with an embodiment.

Turning now to FIG. 7, illustrated is an example machine to read and execute computer readable instructions, in accordance with an embodiment. Specifically, FIG. 7 shows a diagrammatic representation of the data processing service 102 (and/or data processing system) in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 800. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the transaction module 330 and/or the file management module 335. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 120, via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

SUMMARY

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method, comprising:

accessing a cluster including a driver node and one or more executor nodes each including one or more task engines, the cluster configured to schedule queries according to at least a first queue, a second queue, and a third queue, the first queue storing information on queries with a higher priority than queries assigned to the second queue, and the second queue storing information on queries with a higher priority than queries assigned to the third queue;

receiving a query and assigning the query to the first queue, the query divided into a set of tasks;

allocating a number of task engines in a first set of executor nodes to process the set of tasks of the query;

monitoring a resource time for the query while the query is being executed at the first set of executor nodes;

responsive to determining that the resource time for the query is equal to or above a threshold resource time, assigning the query to the second queue;

responsive to assigning the query to the second queue, executing the tasks of the query on a second set of executor nodes;

responsive to determining that a second resource time for the query is equal to or above a second threshold resource time, assigning the query to the third queue; and responsive to assigning the query to the third queue, executing the tasks of the query on a third set of executor nodes.

2. The method of claim 1, wherein a number of executor nodes in the third set of executor nodes is smaller than a number of executor nodes in the first set of executor nodes.

3. The method of claim 1, further comprising:

receiving another query for execution;

responsive to assigning the query to the second queue, assigning task engines to the another query assigned to the first queue; and reallocating at least a portion of executor nodes from the first set of executor nodes to process the other query assigned to the first queue.

4. The method of claim 1, wherein monitoring the resource time comprises:

determining, for each task of the query, an execution time to execute the task on a respective task engine; and summing the execution time of the tasks of the query to determine the resource time.

5. The method of claim 1, further comprising:

monitoring a number of tasks for queries assigned to the first queue;

determining a number of task engines to be reserved for queries assigned to the first queue based on the monitored number of tasks; and reserving the number of task engines on the cluster for queries assigned to the first queue for a next time step.

6. The method of claim 5, wherein the number of tasks for queries assigned to the first queue includes pending and running tasks, and wherein reserving the number of task engines on the cluster for queries assigned to the first queue for the next time step includes:

applying an exponential moving average (EMA) function on a sum of the pending and the running tasks; and reserving Y task engines for the queries in the first queue, where Y=f (aggressiveness factor, X), where X is the sum of the pending and the running tasks and the aggressiveness factor is a constant.

7. The method of claim 1, further comprising:

monitoring a number of task engines for processing queries assigned to the third queue;

responsive to determining that the number of task engines is equal to or above a threshold, reducing at least the third set of executor nodes dedicated to processing the query.

8. A non-transitory computer-readable storage medium comprising stored instructions that, when executed by one or more computer processors, causes the one or more computer processors to:

access a cluster including a driver node and one or more executor nodes each including one or more task engines, the cluster configured to schedule queries according to at least a first queue, a second queue, and a third queue, the first queue storing information on queries with a higher priority than queries assigned to the second queue, and the second queue storing information on queries with a higher priority than queries assigned to the third queue;

receive a query and assigning the query to the first queue, the query divided into a set of tasks;

allocate a number of task engines in a first set of executor nodes to process the set of tasks of the query;

monitor a resource time for the query while the query is being executed at the first set of executor nodes;

responsive to determining that the resource time for the query is equal to or above a threshold resource time, assign the query to the second queue;

responsive to assigning the query to the second queue, execute the tasks of the query on a second set of executor nodes;

responsive to determining that a second resource time for the query is equal to or above a second threshold resource time, assign the query to the third queue; and responsive to assigning the query to the third queue, execute the tasks of the query on a third set of executor nodes.

9. The non-transitory computer-readable storage medium of claim 8, wherein a number of executor nodes in the third set of executor nodes is smaller than a number of executor nodes in the first set of executor nodes.

10. The non-transitory computer-readable storage medium of claim 8, wherein the instructions further cause the one or more computer processors to:

receive another query for execution;

responsive to assigning the query to the second queue, assign task engines to the another query assigned to the first queue; and reallocate at least a portion of executor nodes from the first set of executor nodes to process the other query assigned to the first queue.

11. The non-transitory computer-readable storage medium of claim 8, wherein the instructions further cause the one or more computer processors to:

determine, for each task of the query, an execution time to execute the task on a respective task engine; and sum the execution time of the tasks of the query to determine the resource time.

12. The non-transitory computer-readable storage medium of claim 8, wherein the instructions further cause the one or more computer processors to:

monitor a number of tasks for queries assigned to the first queue;

determine a number of task engines to be reserved for queries assigned to the first queue based on the monitored number of tasks; and reserve the number of task engines on the cluster for queries assigned to the first queue for a next time step.

13. The non-transitory computer-readable storage medium of claim 12, wherein the number of tasks for queries assigned to the first queue includes pending and running tasks, and wherein the instructions further cause the one or more computer processors to:

apply an exponential moving average (EMA) function on a sum of the pending and the running tasks; and reserve Y task engines for the queries in the first queue, where Y=f(aggressiveness factor, X), where X is the sum of the pending and the running tasks and the aggressiveness factor is a constant.

14. The non-transitory computer-readable storage medium of claim 8, wherein the instructions further cause the one or more computer processors to:

monitor a number of task engines for processing queries assigned to the third queue;

responsive to determining that the number of task engines is equal to or above a threshold, reduce at least the third set of executor nodes dedicated to processing the query.

15. A computer system comprising:

one or more computer processors; and one or more non-transitory computer readable storage mediums comprising stored instructions that, when executed by one or more computer processors, causes the one or more computer processors to:

access a cluster including a driver node and one or more executor nodes each including one or more task engines, the cluster configured to schedule queries according to at least a first queue, a second queue, and a third queue, the first queue storing information on queries with a higher priority than queries assigned to the second queue, and the second queue storing information on queries with a higher priority than queries assigned to the third queue;

receive a query and assigning the query to the first queue, the query divided into a set of tasks;

allocate a number of task engines in a first set of executor nodes to process the set of tasks of the query;

monitor a resource time for the query while the query is being executed at the first set of executor nodes;

responsive to determining that the resource time for the query is equal to or above a threshold resource time, assign the query to the second queue;

responsive to assigning the query to the second queue, execute the tasks of the query on a second set of executor nodes;

responsive to determining that a second resource time for the query is equal to or above a second threshold resource time, assign the query to the third queue; and responsive to assigning the query to the third queue, execute the tasks of the query on a third set of executor nodes.

16. The computer system of claim 15, wherein a number of executor nodes in the third set of executor nodes is smaller than a number of executor nodes in the first set of executor nodes.

17. The computer system of claim 15, wherein the instructions further cause the one or more computer processors to:

receive another query for execution;

responsive to assigning the query to the second queue, assign task engines to the another query assigned to the first queue; and reallocate at least a portion of executor nodes from the first set of executor nodes to process the other query assigned to the first queue.

18. The computer system of claim 15, wherein the instructions further cause the one or more computer processors to:

determine, for each task of the query, an execution time to execute the task on a respective task engine; and sum the execution time of the tasks of the query to determine the resource time.

19. The computer system of claim 15, wherein the instructions further cause the one or more computer processors to:

monitor a number of tasks for queries assigned to the first queue;

determine a number of task engines to be reserved for queries assigned to the first queue based on the monitored number of tasks; and reserve the number of task engines on the cluster for queries assigned to the first queue for a next time step.

20. The computer system of claim 19, wherein the number of tasks for queries assigned to the first queue includes pending and running tasks, and wherein the instructions further cause the one or more computer processors to:

apply an exponential moving average (EMA) function on a sum of the pending and the running tasks; and reserve Y task engines for the queries in the first queue, where Y=f (aggressiveness factor, X), where X is the sum of the pending and the running tasks and the aggressiveness factor is a constant.

* * * * *